US008885056B2

(12) United States Patent
Takagi

(10) Patent No.: US 8,885,056 B2
(45) Date of Patent: Nov. 11, 2014

(54) DIGITAL CAMERA

(71) Applicant: Nikon Corporation, Tokyo (JP)

(72) Inventor: Morihiro Takagi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/270,019

(22) Filed: May 5, 2014

(65) Prior Publication Data

US 2014/0232898 A1 Aug. 21, 2014

Related U.S. Application Data

(63) Continuation of application No. 13/602,949, filed on Sep. 4, 2012, now Pat. No. 8,754,952, which is a continuation of application No. 12/926,764, filed on Dec. 8, 2010, now abandoned, which is a continuation of application No. 11/882,031, filed on Jul. 30, 2007, now abandoned.

(30) Foreign Application Priority Data

Aug. 4, 2006 (JP) ................................ 2006-213440

(51) Int. Cl.
*H04N 5/232* (2006.01)
*H04N 5/222* (2006.01)

(52) U.S. Cl.
CPC ....... *H04N 5/23229* (2013.01); *H04N 5/23216* (2013.01)
USPC .................. 348/211.5; 348/211.6; 348/333.05

(58) Field of Classification Search
None
See application file for complete search history.

(56) References Cited

U.S. PATENT DOCUMENTS

| 6,650,365 B1 | 11/2003 | Sato |
| 6,680,749 B1 | 1/2004 | Anderson et al. |
| 6,825,950 B1 | 11/2004 | Inagaki |
| 6,850,271 B1 | 2/2005 | Ichikawa |
| 7,259,786 B2 | 8/2007 | Shimizu |
| 7,304,668 B2 | 12/2007 | Ichikawa et al. |
| 7,379,620 B2 | 5/2008 | Kobayashi |

(Continued)

FOREIGN PATENT DOCUMENTS

| EP | 1 089 161 A2 | 4/2001 |
| JP | A-2001-169174 | 6/2001 |
| JP | A-2005-039339 | 2/2005 |
| JP | A-2005-157641 | 6/2005 |

OTHER PUBLICATIONS

Nov. 5, 2007 European Search Report for European Patent Application No. 07 11 3648.5.

(Continued)

*Primary Examiner* — Aung S Moe
*Assistant Examiner* — Euel Cowan
(74) *Attorney, Agent, or Firm* — Oliff PLC

(57) ABSTRACT

A digital camera captures an image of a photographic subject and creates image data, and records this image data upon a recording medium. The digital camera includes: an image processing device that, according to operation by a user, performs any of a plurality of types of image processing upon the image data that has been recorded; and a control device that, for performing the image processing, (a) if image data is first selected, permits selection of a type of image processing that is to be performed upon the selected image data; and (b) if a type of image processing is first selected, permits selection of image data upon which that selected type of image processing is to be performed.

2 Claims, 9 Drawing Sheets

(56) References Cited

U.S. PATENT DOCUMENTS

| | | | |
|---|---|---|---|
| 7,515,181 B2 | 4/2009 | Terashita | |
| 7,633,523 B2 | 12/2009 | Toyoda et al. | |
| 8,576,416 B2 * | 11/2013 | Oba | 358/1.13 |
| 2001/0035909 A1 | 11/2001 | Kubo | |
| 2002/0080251 A1 | 6/2002 | Moriwaki | |
| 2003/0179300 A1 | 9/2003 | Terashita | |
| 2003/0197879 A1 | 10/2003 | Terashita | |
| 2004/0027461 A1 | 2/2004 | Boyd | |
| 2005/0125744 A1 | 6/2005 | Hubbard et al. | |
| 2005/0206734 A1 | 9/2005 | Kubo et al. | |
| 2006/0028667 A1 * | 2/2006 | Saito | 358/1.13 |
| 2006/0055808 A1 | 3/2006 | Maeng et al. | |
| 2006/0056712 A1 | 3/2006 | Endo | |
| 2008/0012943 A1 | 1/2008 | Watanabe et al. | |

OTHER PUBLICATIONS

Dec. 21, 2010 Office Action issued in Japanese Patent Application No. 2006-213440 with English Translation.

Sep. 10, 2012 Office Action issued in European Patent Application No. 07 113 648.5.

Dec. 6, 2012 Office Action issued in U.S. Appl. No. 13/602,949.

Jul. 31, 2013 Office Action issued in U.S. Appl. No. 13/602,949.

* cited by examiner

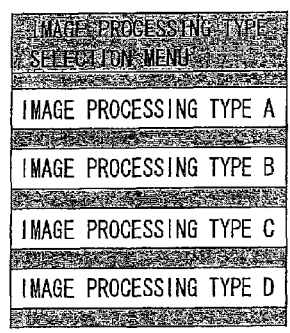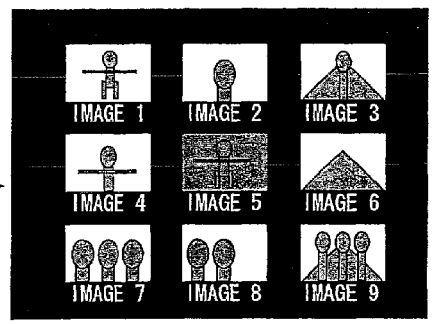
FIG.3A FIG.3B

DIGITAL CAMERA

INCORPORATION BY REFERENCE

This is a Continuation of application Ser. No. 13/602,949 filed Sep. 4, 2012, which is a Continuation of application Ser. No. 12/926,764, filed Dec. 8, 2010, which in turn is a Continuation of application Ser. No. 11/882,031, filed Jul. 30, 2007 and claims the benefit of Japanese Patent Application No. 2006-213440, filed Aug. 4, 2006. The disclosures of the prior applications are hereby incorporated by reference herein in their entirety.

BACKGROUND OF THE INVENTION

1. Field of the Invention

The present invention relates to a digital camera, with which image processing can be performed upon photographed image data.

2. Description of Related Art Japanese Laid Open Patent Publication No. 2001-169174 discloses a digital camera with which photographed (recorded) image data is re-recordable after it is read out from a memory card to be subjected to image processing such as a sharpness process, a contrast control, a chroma control, etc.

SUMMARY OF THE INVENTION

A digital camera that captures an image of a photographic subject and creates image data, and records this image data upon a recording medium according to 1st aspect of the present invention includes: an image processing device that, according to operation by a user, performs any of a plurality of types of image processing upon the image data that has been recorded; and a control device that, for performing the image processing, (a) if image data is first selected, permits selection of a type of image processing that is to be performed upon the selected image data; and (b) if a type of image processing is first selected, permits selection of image data upon which that selected type of image processing is to be performed.

According to a 2nd aspect of the present invention, it is preferable that the digital camera according to the 1st aspect further includes: a decision device that decides whether performing image processing upon image data is appropriate; and a prohibition device that prohibits the image processing, if the decision device has decided that it is not appropriate to perform the image processing upon the image data.

According to a 3rd aspect of the present invention, in the digital camera according to the 2nd aspect, if image data is first selected, the prohibition device may prohibit the selection of a type of image processing that the decision device has decided it is not appropriate to perform upon that selected image data.

According to a 4th aspect of the present invention, in the digital camera according to the 2nd aspect, if a type of image processing is first selected, the prohibition device may prohibit the selection of image data upon which the decision device has decided it is not appropriate to perform that selected type of image processing.

According to a 5th aspect of the present invention, in the digital camera according to the 1st aspect, the control device, in method (b) in which a type of image processing is first selected and image data is selected thereafter, may permit image processing to be performed using a plurality of sets of image data.

A digital camera that captures an image of a photographic subject and creates image data, and records this image data upon a recording medium according to a 6th aspect of the present invention includes: an image processing device that, according to operation by a user, performs any of a plurality of types of image processing upon the image data that has been recorded; a decision device that decides whether performing image processing upon image data is appropriate; and a control device that prohibits the image processing, if the decision device has decided that it is not appropriate to perform the image processing upon the image data.

According to a 7th aspect of the present invention, in the digital camera according to the 6th aspect, the decision device may decide whether performing image processing upon image data is appropriate or not, based upon photographic conditions during image capture of the image data.

According to a 8th aspect of the present invention, in the digital camera according to the 7th aspect, the decision device may decide whether performing image processing upon image data is appropriate or not, based upon details of previous image processing of the image data.

According to a 9th aspect of the present invention, in the digital camera according to the 8th aspect, the decision device may decide that it is not appropriate to perform, upon a same image data, a same type of image processing as has been previously performed.

A computer-readable computer program product according to a 10th aspect of the present invention contains an image processing control program, with the image processing control program including: instructions for performing image processing upon image data; instructions for, for performance of the image processing, if image data is first selected, permitting selection of a type of image processing that is to be performed upon that selected image data; and instructions for, for performance of the image processing, if a type of image processing is first selected, permitting selection of image data upon which that selected type of image processing is to be performed.

A computer-readable computer program product according to a 11th aspect of the present invention contains an image processing control program, with the image processing control program including: instructions for performing image processing upon image data; instructions for, according to operation by a user, performing any of a plurality of types of image processing upon the image data that has been recorded; instructions for deciding whether performing image processing upon image data is appropriate; and instructions for prohibiting the image processing, if it has been decided that it is not appropriate to perform the image processing upon the image data.

According to a 12th aspect of the present invention, in the computer-readable computer program product according to the 10th or 11th aspect, the computer-readable computer program product may be a recording medium on which the control program is recorded.

According to a 13th aspect of the present invention, in the computer-readable computer program product according to the 10th or 11th aspect, the computer-readable computer program product is a carrier wave in which the control program may be embodied as a data signal.

BRIEF DESCRIPTION OF THE DRAWINGS

FIGS. 3A and 3B are figures for explanation of control, during image processing, for selecting image data after having previously selected a type of image processing;

FIG. 9 is a figure for explanation of a situation in which a control program for image processing is supplied via a recording medium or a data signal such as the Internet or the like.

DESCRIPTION OF THE PREFERRED EMBODIMENTS

An embodiment of the present invention will now be described with reference to FIGS. 1 through 8.

Figure 1:
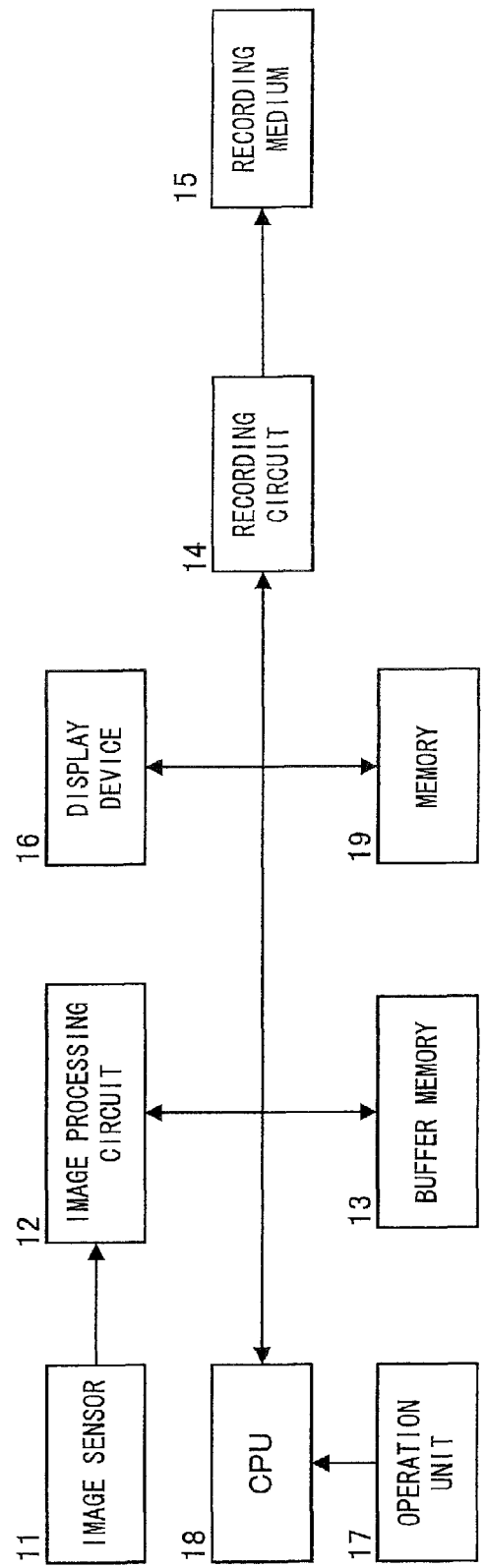
FIG. 1 is a control block diagram of a digital camera according to an embodiment of the present invention.

FIG. 1 is a block diagram of a digital camera according to this embodiment. A light flux from a photographic subject that has passed through a photographic lens (not shown in the figures) is photoelectrically converted by an image sensor 11 that includes, for example, a CCD sensor or a CMOS sensor or the like. The image signal that is the photoelectric conversion output of the image sensor 11 is subjected to various types of processing by an image processing circuit 12, and thereby image data is generated. This image data, after having been temporarily stored in a buffer memory 13, is recorded via a recording circuit 14 upon a recording medium 15 such as a memory card or the like as an image file. This image file is in a format that can be handled by a computer, and normally includes additional information (for example Exif information) as well as the image data. The date on which this image was photographed is recorded in this appended information, as well as its photographic conditions (such as aperture value, shutter speed, presence or absence of flash emission, and the like). The recording medium 15 can be inserted into the digital camera, and can be extracted therefrom, via a slot not shown in the figures that is provided to the digital camera. Alternatively, it would also be acceptable to arrange for the recording medium to be an internal memory that is housed within the digital camera.

A display device 16 includes a liquid crystal monitor that is disposed, for example, upon the rear surface of the digital camera, and a drive circuit therefor, and is capable of performing image display, menu display, and the like. And an operation unit 17 includes various operation members such as a release button and various types of operation buttons and the like that are used during a reproducing mode as will be described hereinafter, and ON/OFF switches that are interlocked with the actuation of these members. The CPU 18 executes operations based on programs stored in a memory 19, and drive controls the various circuits and devices described above based upon input from the operation unit 17.

Next, image processing upon a recorded image will be explained.

As described above, this digital camera performs predetermined image processing upon an image signal that has been obtained by the image capture process, and records the image data upon the recording medium 15 after it has been thus image processed. Separately from that initial image processing, this digital camera is also capable of reading out image data that has been recorded upon the recording medium 15, of performing image processing thereupon as desired by the user, and of then recording it back to the recording medium 15 again. In the following explanation, unless particularly specified otherwise, "image processing" will be used to mean this type of processing upon such recorded image data.

As for the types of image processing that may be selected, these include a tone compensation, a white balance control, a color conversion (including conversion to monochrome), a trimming, a red eye compensation, a distortion correction, a noise removal, an image size reduction, and the like. A plurality of processes may also be executed upon a single set of image data. When image processing is performed upon some image data, the name of this image processing is stored in correspondence with the image data. For example, the name of the image processing may be recorded in the additional information described above.

The following two types of order for performing the image processing are available, and the user can select either one of them:

(1) First the image data is selected, and next the type of image processing is selected.

(2) First the type of image processing is selected, and next the image data is selected.

Figure 2:
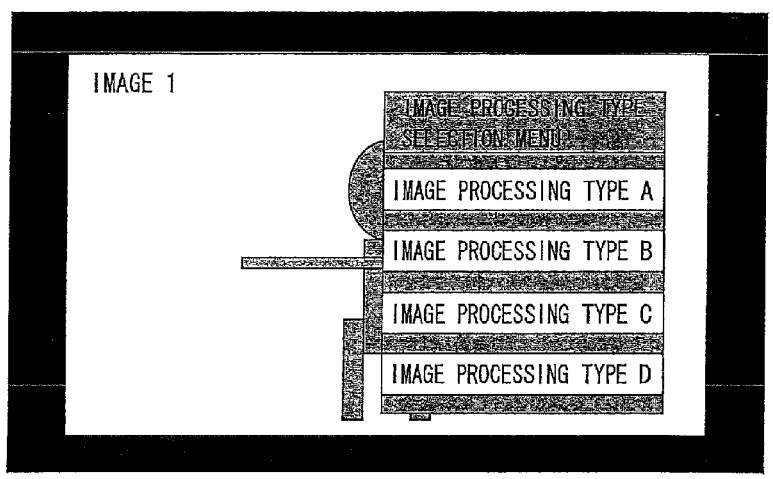
FIG. 2 is a figure for explanation of control, during image processing, for selecting a type of image processing after having previously selected image data.

The method (1) will now be explained with reference to FIG. 2. When by actuating the operation unit 17 the user selects image data (for example, an image 1) upon which image processing is to be performed, an image of the photographic subject is displayed upon the display device 16 based upon this image data. And when, in this state, the user operates the operation unit 17 and issues a command for image processing to be performed, an image processing type selection menu as seen in the figure is displayed as superimposed over this image of the photographic subject. In this image processing type selection menu, a list of the above described types of image processing is displayed, and the user is able to select any one of these types of image processing by actuation of the operation unit 17. For the image processing type A, the image processing type B, and so on shown in this figure, actually the specific names of these types of image processing are displayed. When any one of these image processing types is selected, this selected type of image processing is performed upon the image data, and, along with displaying the resultant image after this image processing, the image data after image processing is recorded upon the recording medium 15.

This method (1) is convenient when the image data is settled upon in advance, and the user desires to perform some type of image processing upon this image data.

Next, the method (2) will now be explained with reference to FIG. 3. When by operating the operation unit 17 the user issues a command to perform image processing before actually causing any images to be displayed, then an image processing type selection menu is displayed upon the display device 16, as shown in FIG. 3A. When the user selects any one of these types of image processing, then an image selection screen is displayed for selection of the image data upon which this type of image processing is to be performed, as shown in FIG. 3B. On this image selection screen, a plurality of image data that are recorded upon the recording medium 15 are displayed as thumbnail images. In FIG. 3B, by way of example, nine such thumbnail images are displayed upon each page, and changing between pages is performed with a predetermined operation using the operation unit 17.

When the user selects any one of these thumbnail images by operating the operation unit 17, the type of image processing that was selected in advance is performed upon the image data that corresponds to the image that has thus been selected. Although fundamentally only one image can be selected, it may be possible to select a plurality of image data, depending upon the type of image processing that has been selected. For example, if "resize" has been selected as the image processing type, then it is made possible for a plurality of image data to be selected.

This method (2) is convenient when the type of image processing is settled upon in advance, and the user desires to check the advantageous effect of performing this type of image processing upon various image data.

Now although, as described above, there are a plurality of types of image processing that can be selected, it is not the case that every one of these types of image processing can be performed upon every image. For example since the so called red eye phenomenon, in which the eyes of a person are tinged with red color, is an effect that only can be generated if flash photography was performed in the first place. Accordingly, for an image that was not shot using flash photography in the first place, even if "red eye compensation" is performed upon the image data, this has no meaning. Accordingly, when image data for an image that was shot with non-flash photography has been selected, it is made to be impossible to select "red eye compensation". Furthermore, when "red eye compensation" has been selected first, it is made to be impossible to select image data for images that were shot with non-flash photography.

As another example, it is made to be impossible to select "white balance control" for images upon whose image data "color conversion (convert to monochrome)" has already been performed, so that, if "white balance control" is selected first, then it is made to be impossible to select image data for images upon which "color conversion (convert to monochrome)" has already been performed. Moreover, it is made to be impossible to perform a type of image processing, that has already been performed once, for a second time upon the same image data. Yet further, it is made to be impossible to perform other image processing upon image data, upon which "trimming" or "resize" has already been performed.

Figure 4:
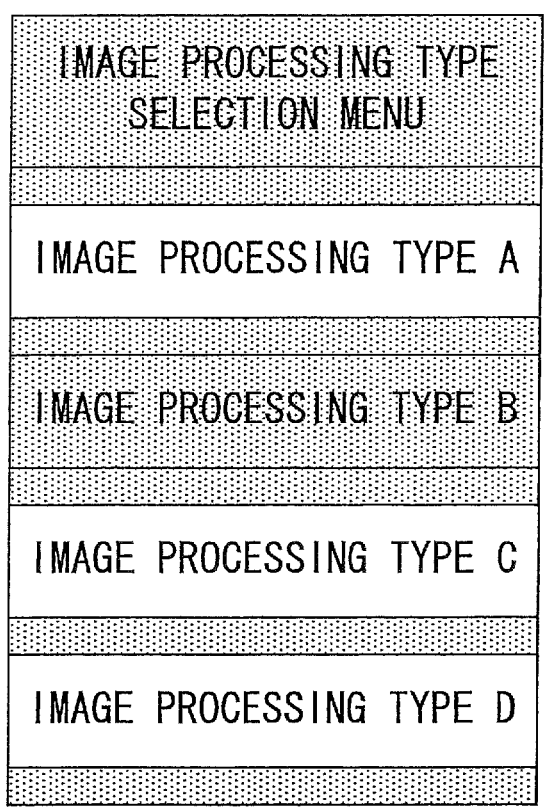
FIG. 4 is a figure showing an example of a case in which a type of image processing that cannot be selected is present upon a selection menu for image processing type.

FIG. 4 shows an example of display in a case in which, with the method (1), it has been made to be impossible to select image processing type B. On the image processing type selection menu, the portion for the image processing type B is made to be an inactive display (for example is displayed as grey), so that the user is notified that this image processing type B cannot be selected. Although it is possible to shift the cursor or selection frame that indicates the currently selected type of image processing upwards or downwards by using the operation unit 17 according to the predetermined operation for selection of image processing type, it is arranged, in this shifting, to skip the portion of the display for the image processing type B, so that it cannot be selected. Furthermore, on the image selection screen for the method (2), by a similar method, it may be arranged to display portions corresponding to specified thumbnail images as inactive display portions, or to make it impossible to select such thumbnail images.

It should be understood that it would also be acceptable to arrange to display all of the types of image processing or thumbnail images as active portions of the display, and, if the user has attempted to select one of them that should not be selected, to display a message that it cannot be selected, so that, as a result, the user cannot select the same. Alternatively it would also be acceptable to arrange, as an option, not to display any type of image processing or thumbnail image that cannot be selected.

Examples of sequences of processing for implementing control related to the above described image processing are shown by way of example in FIGS. 5 through 8. These processing sequences are executed by the CPU 18 according to a program that is stored in the memory 19.

Figure 5:
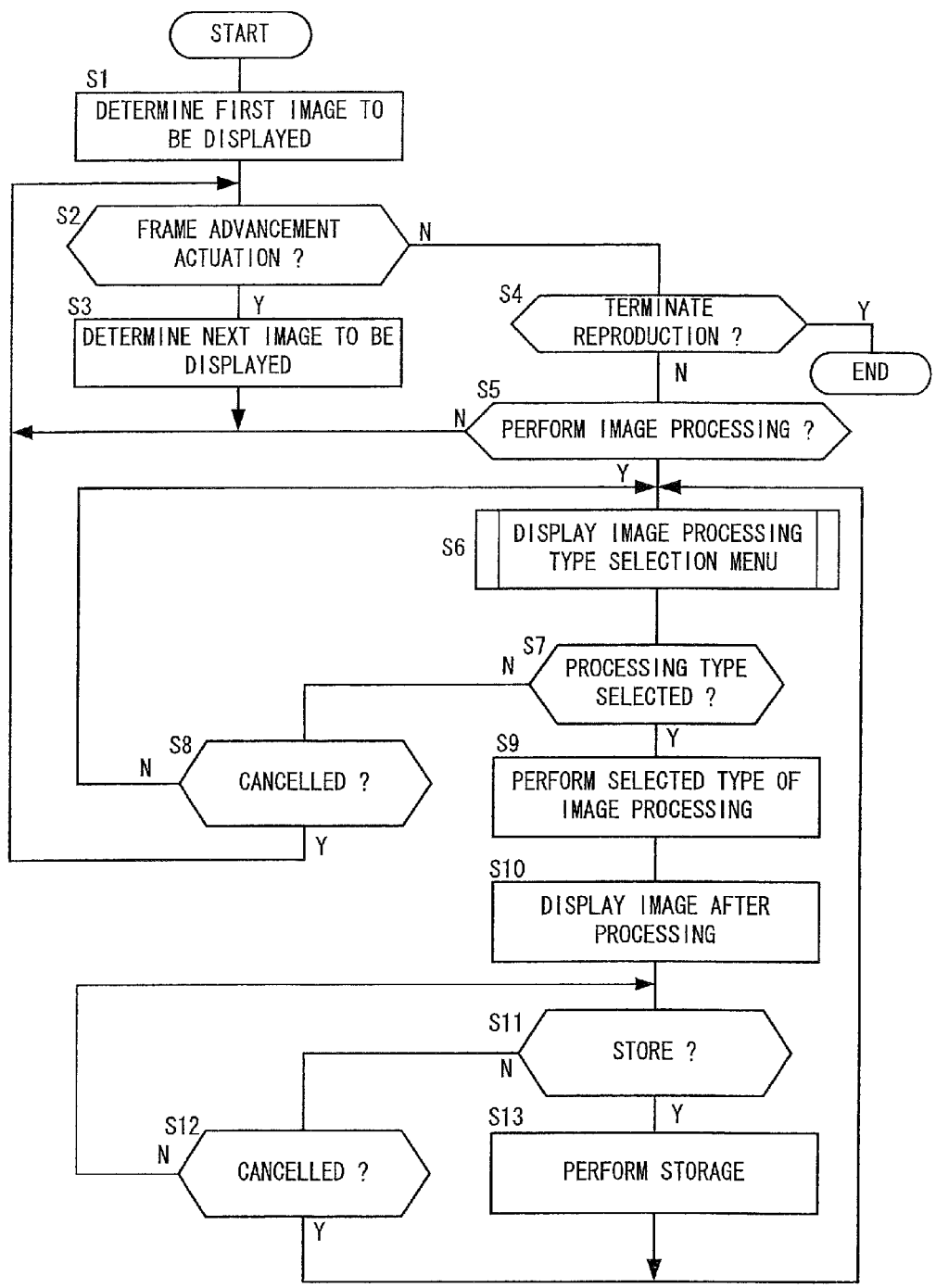
FIG. 5 is a flow chart for explanation of a sequence of control that corresponds to FIG. 2.

FIG. 5 is a flow chart showing an example of a sequence of processing for the method (1). When a reproducing mode is set, this program is started by the CPU 18. In a first step S1, the image data that should be initially displayed is determined. For example, among the image data recorded upon the recording medium 15, the image data for the image that was shot most recently may be taken as image data for image to be displayed initially. Next, in a step S2, a decision is taken as to the presence or absence of operation for frame advancement. If it is confirmed that operation for frame advancement has been performed, then the flow of control proceeds to a step S3, in which the image data for the next image to be displayed is determined; and then the flow of control returns to the step S2. On the other hand, if no operation for frame advancement is confirmed, then the flow of control is transferred to a step S4, in which a decision is taken as to the presence or absence of a user's operation to terminate reproduction. If operation to terminate reproduction has been performed, then the processing of this FIG. 5 flow chart is terminated; while on the other hand, if no operation to terminate reproduction has been performed, then the flow of control proceeds to a step S5.

In this step S5, a decision is made as to whether or not to perform image processing upon the image data for the image that is currently being displayed. If the user performs operation using the operation unit 17 to command image processing to be performed, then the flow of control proceeds to a step S6, in which an image processing type selection menu as shown in FIG. 2 is displayed.

Figure 6:
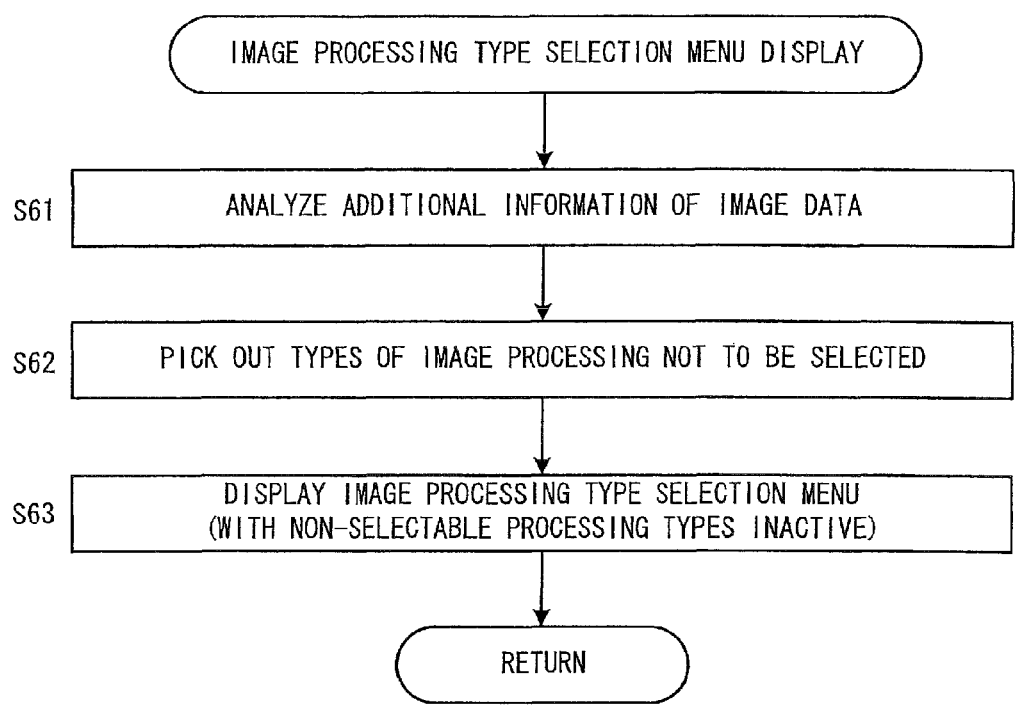
FIG. 6 is a flow chart showing a detailed sequence of control in the processing of FIG. 5 for displaying an image processing type selection menu.

FIG. 6 is a flow chart showing the detailed sequence of control in the image selection menu processing of this step S6 of FIG. 5. In a step S61, the additional information for the image data of the image that is currently selected (i.e. displayed) is analyzed. Next, in a step S62 the type or types of image processing that cannot be selected are picked out. For example, if image data for an image that has been shot with non-flash photography has been selected, then it is made to be impossible to select "red eye compensation". Furthermore, if image data upon which "color conversion (convert to monochrome)" has been performed, then it is made to be impossible to select "white balance control". And, if some type of image processing has already been performed upon the image data that is currently selected, then it is made to be impossible to select this type of image processing. Moreover, it is made to be impossible to select any other type of image processing upon the image data for an image upon which "trimming" or "resize" has already been performed. And next, in a step S63, while the image processing type selection menu is displayed, all of the types of processing for which selection has been made impossible as described above are displayed as inactive display portions, while the other types of processing are displayed as active display portions (refer to FIG. 4).

The user is able to select any one of the types of image processing that has been displayed as active from the image processing type selection menu that has thus been displayed upon the display screen of the display device 16. If in a step S7 of FIG. 5 the user has not selected any type of image processing, then the flow of control proceeds to a step S8. If cancellation operation is performed in this step S8, then the flow of control returns to the step S2. On the other hand, if any one of the types of image processing is selected in the step S7, then the flow of control is transferred to a step S9. In this step S9, the type of image processing that has been selected is performed, via the image processing circuit 12, upon the image data for the image that is currently selected.

Next, in a step S10, an image is displayed based upon the image data after image processing, and then in a step S11 an enquiry is made to the user as to whether or not the image data after image processing is to be stored. If this image data is not to be stored then the flow of control proceeds to a step S12. In this step S12, if a user's cancellation operation is performed, then the flow of control returns to the step S6; while, if cancellation operation is not performed, then the flow of control returns to the step S11. However, if in the step S11 the user commands for the image data to be stored, then the flow of control proceeds to a step S13. In this step S13, the image data after image processing is recorded upon the recording medium 15 separately from the image data before image processing, and then the flow of control returns to the step S6.

It should be understood that there is also an image selection method in which the image that is to be displayed is selected from a plurality of thumbnail images, although this matter is not described in the flow chart of FIG. 5. It is also possible to perform image processing in a similar manner upon image data that has been selected from the plurality of thumbnail images.

Figure 7:
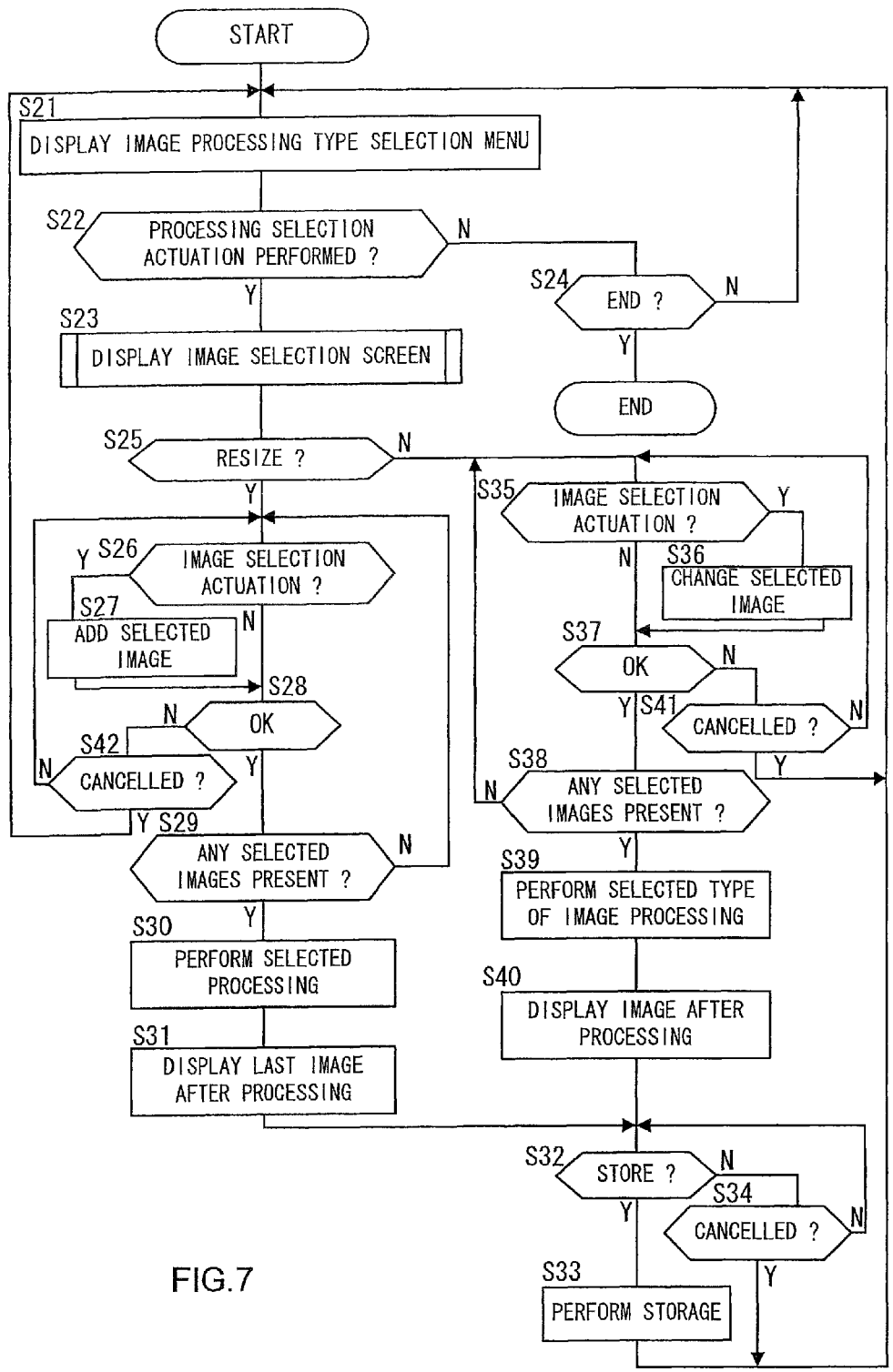
FIG. 7 is a flow chart for explanation of a sequence of control that corresponds to FIGS. 3A and 3B.

FIG. 7 is a flow chart showing an example of a sequence of processing for the method (2). This program is started by the CPU 18 when image processing starting operation is performed by the user in the state in which no image is being displayed. First in a step S21 the image processing type selection menu is displayed (here, all of the types of image processing are displayed as active, as shown in FIG. 3A). Next, when in a step S22 the type of image processing that is to be performed is selected from this image processing type selection menu, the flow of control proceeds to a step S23, and, as shown for example in FIG. 3B, an image selection screen for selection of the image data upon which this selected type of image processing is to be performed is displayed. It should be understood that, if in the step S22 no type of image processing is selected, the flow of control proceeds to a step S24; and, if termination operation has been selected in this step S24, the processing of the FIG. 7 flow chart is terminated.

Figure 8:
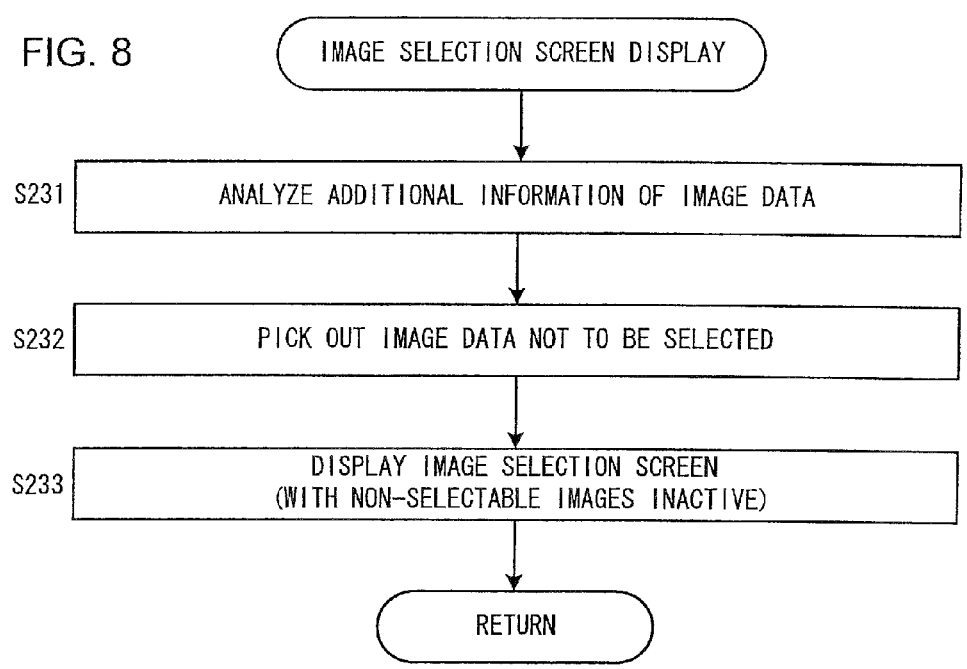
FIG. 8 is a flow chart showing a detailed sequence of control in the processing of FIG. 7 for displaying an image selection screen.

FIG. 8 is a flow chart showing the detailed sequence of control for the image selection screen display performed in the step S23 of FIG. 7. In a step S231, the additional information of the image data that is recorded upon the recording medium 15 is analyzed. In the next step S232, image data upon which the type of image processing that is currently selected should not be performed is picked out. For example, if "red eye compensation" is selected, then it is made to be impossible for the image data for those images that were shot with non-flash photography to be selected. Furthermore, if "white balance control" is selected, then it is made to be impossible for the image data upon which "color conversion (convert to monochrome)" has already been performed to be selected. Yet further, it is made to be impossible for the image data upon which the selected type of image processing has already been performed to be selected. Moreover, it is made to be impossible for the image data upon which "trimming" or "resize" has already been performed to be selected. Finally, in a step S233, the image selection screen is displayed, with all of the thumbnail images upon which it has been made to be impossible for the currently selected processing to be performed being displayed as inactive, and the other thumbnail images being displayed as active.

After having performed display of the image selection screen in the step S23, if a decision is made in the next step S25 that "resize" is being selected as the type of image processing, then the flow of control is transferred to a step S26. If in this step S26 image selection operation is being performed, then the flow of control proceeds to a step S27, in which the image data that has been selected is taken as a candidate for image processing. Since in the case of "resize" it is possible to select a plurality of images, accordingly the image data that has been selected this time is appended as a candidate. Next, if in a step S28 OK operation is performed by the user, then the flow of control proceeds to a step S29, in which a check is made as to whether or not at least one image is being selected. If the result of the decision in this step S29 is negative, then the flow of control returns to the step S26, while if the result is affirmative then the flow of control proceeds to a step S30.

In the step S30, the selected type of image processing (here, "resize") is performed upon the selected image data. Next, in a step S31, an image is displayed based upon the image data after image processing. It should be understood that, if a plurality of image data are selected, the image that has been processed last is displayed. Moreover, it should be understood that if OK operation is not performed in the step S28, then the flow of control is transferred to a step S42. If in this step S42 the user performs cancellation operation, then the flow of control returns to the step 21; while, if the user does not perform cancel operation, then the flow of control returns to the step S26.

In the step S32, an enquiry is made to the user as to whether or not the image data after image processing is to be stored. If this image data is not to be stored then the flow of control proceeds to a step S34. In this step S34, if user cancellation operation is performed, then the flow of control returns to the step S21; while, if cancellation operation is not performed, then the flow of control returns to the step S32. However, if in the step S32 the user commands for the image data to be stored, then in the next step S33 the image data after image processing is recorded upon the recording medium 15 separately from the image data before image processing, and then the flow of control returns to the step S21.

On the other hand, if a negative decision is reached in the step S25, and if some type of image processing other than "resize" is selected, then the flow of control proceeds to a step S35. When in this step S35 image selection is performed, then the flow of control proceeds to a step S36, in which the image data that has been selected is set as a candidate for image processing. Since it is only possible to select a single image except for the case in which the selected type of image processing is "resize", accordingly, in the case where some other image has already been selected, the selection of this image is cancelled, and the image data that is now being selected is set as the candidate for image processing. The processing of the steps S37 and S38 is similar to the processing in the steps S28 and S29. In the step S39, the selected type of image processing is performed upon the image data that is selected, and then in the subsequent step S40 the image after image processing is displayed. Thereafter, the flow of control is transferred to the step S32.

As explained above, according to this embodiment, it is possible to perform image processing upon the image data according to a method that corresponds to the desire of the user, or that corresponds to the circumstances. For example, it is made to be impossible to select a type of image processing that cannot be performed upon the image data that has been selected, or that it is not appropriate to perform thereupon.

Furthermore, it is made to be impossible to select image data upon which the type of image processing that has been selected cannot be performed, or upon which it is not appropriate to perform this type of image processing. Due to this, it is possible to provide a selection function that is easy to understand from the point of view of the user.

It should be understood that the types of image processing that can be selected are not necessarily limited to those described above; for example, it would also be acceptable to arrange for it to be possible to select a type of image processing in which the data for two or more images is combined, so as to create image data for a single image. Since in a reproducing mode the image display is performed one image at a time, accordingly, when performing such image processing in which the data for two or more images is used, it is only possible to employ the method (2) described above, in which, after first having selected the desired type of image processing, subsequently the selection of images is performed.

Figure 9:
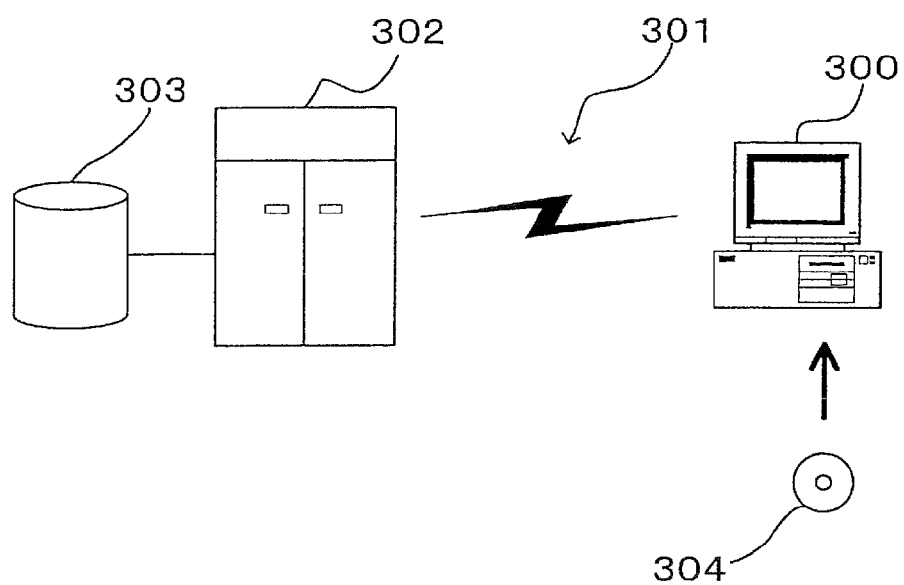

It should be understood that, if the present invention is applied to a personal computer or the like, the program related to control of the above described image processing may be supplied via a recording medium such as a CD-ROM or the like, or via a data signal such as the internet or the like. FIG. 9 is a figure showing such a situation. A personal computer 300 receives supply of a program via a CD-ROM 304. Furthermore, the personal computer 300 is endowed with a function of connection to a communication line 301. A computer 302 is a server computer that supplies the program described above, and stores the program upon a recording medium such as a hard disk 303 or the like. The communication line 301 includes the Internet, a communication line such as a PC communication or the like, or a dedicated communication line or the like. And the computer 302 reads out the program from the hard disk 303, and transmits this program via the communication line 301 to the personal computer 300. In other words, the program is embodied upon a carrier wave as a data signal, and is transmitted via the communication line 301. In this manner, the program may be supplied as a computer program product that can be read in by a computer in various different formats, such as a recording medium or a data signal embodied upon a carrier wave or the like.

Furthermore, with a personal computer, it would also be possible to perform the image processing described above upon image data other than an image of photographic subject that has been captured by the digital camera.

The control described above for image processing may be implemented upon some device that handles image data other than a digital camera; for example, it may also be implemented upon an electronic device such as a photo storage device that stores images, or the like.

The above-described embodiments are examples, and various modifications can be made without departing from the scope of the invention.

What is claimed is:

1. An electronic device that records image data to a recording medium, comprising:
   an image processing device that performs image processing upon the image data recorded to the recording medium;
   a determination device that determines appropriateness of the image processing being performed by the image processing device on the image data recorded to the recording medium; and
   a control device, wherein:
   (i) when image data is selected, according to a user operation, among first image data and second image data recorded to the recording medium, and then image processing to be performed on a selected image data is selected, according to the user operation, among first image processing and second image processing that can be performed by the image processing device,
     (a) the control device controls a display unit to display an image including an inactive display item corresponding to the first image processing which has been determined by the determination device not to be appropriate to perform on the first image data and an active display item corresponding to the second image processing which has not been determined by the determination device not to be appropriate to perform on the first image data if the first image data is selected according to the user operation, and
     (b) the control device controls the display unit to display an image including an inactive display item corresponding to the second image processing which has been determined by the determination device not to be appropriate to perform on the second image data and an active display item corresponding to the first image processing which has not been determined by the determination device not to be appropriate to perform on the second image data if the second image data is selected according to the user operation, and
   (ii) when image processing is selected, according to the user operation, among the first image processing and the second image processing that can be performed by the image processing device, and then image data to which a selected image processing is to be performed is selected, according to the user operation, among the first image data and the second image data recorded to the recording medium,
     (a) the control device controls the display unit to display an image including an inactive display item corresponding to the first image data on which it has been determined by the determination device not to be appropriate to perform the first image processing and an active display item corresponding to the second image data on which it has not been determined by the determination device not to be appropriate to perform the first image processing if the first image processing is selected according to the user operation, and
     (b) the control device controls the display unit to display an image including an inactive display item corresponding to the second image data on which it has been determined by the determination device not to be appropriate to perform the second image processing and an active display item corresponding to the first image data on which it has not been determined by the determination device not to be appropriate to perform the second image processing if the second image processing is selected according to the user operation,
   (iii) when image data is selected, according to the user operation, among the first image data and the second image data recorded to the recording medium, and then image processing to be performed on the selected image data is selected, according, to the user operation, among the first image processing and the second image processing that can be performed by the image processing device,
     (a) the image processing device performs the second image processing on the first image data when the first image data is selected according to the user operation and an item corresponding to the second image processing which has not been determined by the determination device not to be appropriate to perform on the first image data is selected, and (b) the image processing device performs the first image processing on the second image data when the second image data is selected according to the user operation and an item corresponding to the first image processing which has not been determined by the determination device not to be appropriate to perform on the second image data is selected, and (iv) when image processing is selected, according to the user operation, among the first image processing and the second image processing that can be performed by the image processing device, and then image data to which the selected image processing is to be performed is selected, according to the user operation, among the first image data and the second image data recorded to the recording medium, (a) the image processing device performs the first image processing on the second image data when the first image processing is selected according to the user operation and the item corresponding to the second image data on which it has not been determined by the determination device not to be appropriate to perform the first image processing is selected, and (b) the image processing device performs the second image processing on the first image data when the second image processing is selected according to the user operation and the item corresponding to the first image data on which it has not been determined by the determination device not to be appropriate to perform the second image processing is selected.

2. A non-transitory computer-readable storage medium on which a control program is recorded, the computer program capable of being executed by an electronic device that records image data to a recording medium, comprising:

performing image processing upon the image data recorded to the recording medium;

determining appropriateness of the image processing being performed on the image data recorded to the recording medium;

(i) when image data is selected, according to a user operation, among first image data and second image data recorded to the recording medium, and then image processing to be performed on a selected image data is selected, according to the user operation, among first image processing and second image processing that can be performed, (a) controlling a display unit to display an image including an inactive display item corresponding to the first image processing which has been determined as not to be appropriate to perform on the first image data and an active display item corresponding to the second image processing which has not been determined as not to be appropriate to perform on the first image data if the first image data is selected according to the user operation, and (b) controlling the display unit to display an image including an inactive display item corresponding to the second image processing which has been determined as not to be appropriate to perform on the second image data and an active display item corresponding to the first image processing which has not been determined as not to be appropriate to perform on the second image data if the second image data is selected according to the user operation;

(ii) when image processing is selected, according to the user operation, among the first image processing and the second image processing that can be performed, and then image data to which a selected image processing is to be performed is selected, according to the user operation, among the first image data and the second image data recorded to the recording medium, (a) controlling the display unit to display an image including an inactive display item corresponding to the first image data on which it has been determined as not to be appropriate to perform the first image processing and an active display item corresponding to the second image data on which it has not been determined as not to be appropriate to perform the first image processing if the first image processing is selected according to the user operation, and (b) controlling the display unit to display an image including an inactive display item corresponding to the second image data on which it has been determined as not to be appropriate to perform the second image processing and an active display item corresponding to the first image data on which it has not been determined as not to be appropriate to perform the second image processing if the second image processing is selected according to the user operation;

(iii) when image data is selected, according to the user operation, among the first image data and the second image data recorded to the recording medium, and then image processing to be performed on the selected image data is selected, according to the user operation, among the first image processing and the second image processing that can be performed, (a) performing the second image processing on the first image data when the first image data is selected according to the user operation and an item corresponding to the second image processing which has not been determined as not to be appropriate to perform on the first image data is selected, and (b) performing the first image processing on the second image data when the second image data is selected according to the user operation and an item corresponding to the first image processing which has not been determined as not to be appropriate to perform on the second image data is selected; and (iv) when image processing is selected, according to the user operation, among the first image processing and the second image processing that can be performed, and then image data to which the selected image processing is to be performed is selected, according to the user operation, among the first image data and the second image data recorded to the recording medium, (a) performing the first image processing on the second image data when the first image processing is selected according to the user operation and the item corresponding to the second image data on which it has not been determined as not to be appropriate to perform the first image processing is selected, and (b) performing the second image processing on the first image data when the second image processing is selected according to the user operation and the item corresponding to the first image data on which it has not been determined as not to be appropriate to perform the second image processing is selected.

* * * * *